United States Patent [19]
Gonzales et al.

[11] Patent Number: 4,785,356

[45] Date of Patent: Nov. 15, 1988

[54] APPARATUS AND METHOD OF ATTENUATING DISTORTION INTRODUCED BY A PREDICTIVE CODING IMAGE COMPRESSOR

[75] Inventors: Cesar A. Gonzales, Mahopac; William B. Pennebaker, Carmel, both of N.Y.

[73] Assignee: International Business Machines Corporation, Armonk, N.Y.

[21] Appl. No.: 42,132

[22] Filed: Apr. 24, 1987

[51] Int. Cl.$^4$ ............................................. H04N 1/417
[52] U.S. Cl. .................................. 358/260; 358/133; 358/135; 358/282
[58] Field of Search ............... 358/260, 261, 262, 133, 358/135, 280, 282, 284; 382/54, 56; 364/518, 514

[56] References Cited

U.S. PATENT DOCUMENTS

| | | | |
|---|---|---|---|
| 3,729,678 | 4/1973 | Glasbergen et al. | 325/38 A |
| 3,921,204 | 11/1975 | Thompson | 358/13 |
| 3,984,626 | 10/1976 | Mounts et al. | 178/6 |
| 3,987,412 | 10/1976 | Morrin, II | 340/146.3 AE |
| 4,028,731 | 6/1977 | Arps et al. | 358/260 |
| 4,124,870 | 11/1978 | Schatz et al. | 358/260 |
| 4,125,861 | 11/1978 | Mounts et al. | 358/133 |
| 4,268,615 | 5/1981 | Schreiber et al. | 358/138 |
| 4,353,092 | 10/1982 | Bailey et al. | 358/160 |
| 4,369,463 | 1/1983 | Anastassiou et al. | 358/135 |
| 4,386,366 | 5/1983 | Mori | 358/135 |
| 4,454,546 | 5/1984 | Mori | 358/260 |
| 4,488,174 | 12/1984 | Mitchell et al. | 358/136 |
| 4,488,175 | 12/1984 | Netravali | 358/136 |
| 4,504,864 | 3/1985 | Anastassiou et al. | 358/167 |
| 4,519,085 | 5/1985 | Catros | 375/27 |
| 4,554,593 | 11/1985 | Fox et al. | 358/282 |
| 4,554,670 | 11/1985 | Aiko et al. | 375/30 |
| 4,562,467 | 12/1985 | Bradley | 358/135 |
| 4,562,486 | 12/1985 | Suzuki et al. | 358/262 |
| 4,573,167 | 2/1986 | Hentschke et al. | 375/27 |
| 4,578,713 | 3/1986 | Tsao et al. | 358/283 |
| 4,581,638 | 4/1986 | Chiariglione et al. | 358/135 |
| 4,593,325 | 6/1986 | Kannapell et al. | 358/282 |
| 4,599,656 | 7/1986 | Bellinghausen | 358/261 |
| 4,601,056 | 7/1986 | Habitzreiter et al. | 382/50 |
| 4,602,383 | 7/1986 | Ogawa et al. | 382/56 |
| 4,613,948 | 9/1986 | Ghoravi | 364/526 |
| 4,633,325 | 12/1986 | Usubuchi | 358/260 |
| 4,636,856 | 1/1987 | Starck | 358/135 |

OTHER PUBLICATIONS

Joel Max, "Quantizing for Minimum Distortion", Sep. 25, 1959.

D. Anastassiou, W. Pennebaker and J. Mitchell, "Gray-Scale Image Coding for Freeze-Frame, Video-conferencing", Apr. 1986.

(List continued on next page.)

Primary Examiner—Edward L. Coles, Sr.
Attorney, Agent, or Firm—Marc A. Block

[57] ABSTRACT

The present invention relates to a predictive coding method and related apparatus which (a) computes a value D representing the difference between an original graylevel value for a current pixel and a predicted value for the current pixel; (b) associates each successive range of D values to a respective quantization level, each quantization level QN having a respective QN value representing the range corresponding thereto; (c) sets a respective QERR value to D for the current pixel, when the QN value is zero; (d) re-maps m QERR values to n ($n \leq m$) MERR values; (e) assigns to the value MERR=O those QERR values in which $|QERR| \leq (+Q1\ VALUE)/2$ sums the MERR values for successive pixels in a QN=QO region; and (f) adjusts the QN value from the value of QO by the value of Q1 for a pixel at which the summed value reaches a predefined threshold. QN values, adjusted as appropriate, are subjected to entropy coding compression and decompression. In the decompression process, pixel values are reconstructed. According to the invention, the reconstructed values are subjected to a vertical filter in which a pixel having a reconstructed value $I_0$ is filtered to have a value $$I'_O = I_0 + [(I_{-1} - I_0) c_- + (I_{+1} - I_0) c_+]$$

wherein C+ and C− are respective predefined clamping values, and wherein $I_{-1}$ and $I_{+1}$ are the respective reconstructed values of pixels adjacently below and adjacently above the current pixel.

9 Claims, 4 Drawing Sheets

OTHER PUBLICATIONS

D. Anastassiou, W. Pennebaker, J. Mitchell, "Freeze--Frame Video Compression on a Small Computer", 4-86.

IBM Technical Disclosure Bulletin, vol. 20, No. 5, Oct. 1977, K. Y. Wong, "Suppression of Moire Patterns by Error Feedback".

IBM Technical Disclosure bulletin, vol. 25, No. 3A, Aug. 1982, D. Anastassiou, J. Mitchell, "Dual Resolution Adaptive DPCM".

IBM Technical Disclosure Bulletin, vol. 25, No. 10, Mar. 1983, D. Anastassiou, "Lossy Gary Scale Compression Using Biased Adaptive DeHa Modulation...".

IBM Technical Disclosure Bulletin, vol. 27, No. 11, Apr. 1985, A. S. Murphy, "Reducing Staircasing by Using Grey Scale".

a   b   c   d

APPARATUS AND METHOD OF ATTENUATING DISTORTION INTRODUCED BY A PREDICTIVE CODING IMAGE COMPRESSOR

BACKGROUND OF THE INVENTION

I. Field of the Invention

The present invention relates to image data compression and more particularly to reducing distortion in images which are data compressed and reconstructed using predictive coding methods.

II. Description of the Problem

Typically an image is represented as rows of picture elements referred to as "pixels" or "pels". To characterize the image as digital data, a feature (e.g., luminance, red intensity, blue intensity, or the like) of each pixel is normally represented by a value referred to as a "graylevel" value. For luminance, the graylevel value ranges from white to black over a plurality of steps. For example, in an eight bit representation, each pixel may be represented by a graylevel value from between 0 and 255 ($2^8-1$). For an image having 512 pixels per row and 480 rows, a total of $512\times480\times8=1966080$ bits would be required to represent all of the pixels in an image. This is a form of pulse code modulation (PCM).

In applications in which image data is to be transferred quickly and/or is to be contained in limited storage, it is often required to represent the graylevel information for the pixels in an image by less than the nearly two million bits indicated above. The process of reducing the required number of bits is referred to as image data compression. Associated with data compression is a complementary process (i.e., decompression) by which the original pixel values can be approximated from the compressed data.

One prior art method of compressing image data involves predictive coding. According to the basic teachings of predictive coding, a predicted value—based on one or more neighboring pixel values—is determined for a "current" pixel (i.e., a pixel which is currently being processed). The difference D between the original graylevel value for the current pixel and the predicted value therefor is mapped to a corresponding quantization level of a previously defined quantization table. In the quantization table, each of various ranges of difference values is designated by a corresponding QN level (where N is the level). For example, QN=Q0 corresponds to difference values that extend over a first range; QN=Q1 corresponds to difference values extending over a second range; and so on. Typically, the QN levels in the quantizer table are symmetrical about the Q0 level. For simplicity, reference is made to only the "positive" portion of the quantizer table in which $N \geq 0$ (e.g. Q0, Q1, Q2, and so on). Each level has a predefined value associated therewith; for example, Q0 may be designated as 0; Q1 may be designated as 4; Q2 may be designated as 12; and so on. (Due to the aforementioned symmetry, the first quantizer level below Q0 has a value of $-Q1$ VALUE, or $-4$; the second quantizer level below Q0 has a value of $-12$; and so on). Accordingly, if the magnitude of the difference value for a given pixel is in the first range, the predictive coder selects QN=Q0 and the value designated therefor (namely 0) is provided. Similarly, if the difference value for a given pixel is in the second (positive) range, QN=Q1 and the designated value therefore (namely 4) is provided. Rather than an 8-bit PCM representation, predictive coding provides that the designated value for the QN level serve to represent the graylevel of a pixel. A specific known type of predictive coding is differential pulse code modulation (DPCM).

In accordance with predictive coding, by looking at the value for QN rather than the original (8-bit) graylevel value, the pixel data is greatly compressible.

Another prior art data compression technique, which is often used in combination with predictive coding, is referred to as "entropy coding" or "variable-length coding". In entropy coding, the number of bits used in representing events is intended to be inversely related to event probability. In a predictive coding context, entropy coding is applied to the quantization levels (or designated values therefor). That is, the more probable quantization levels are represented by code-words characterized by relatively short lengths (of bits), whereas less probable quantization levels are represented by relatively longer lengths. The correct assignment of code-word lengths is dictated by information theory concepts; however, it should be intuitively clear that the more often the short code-words get used, the better the compression. In this regard, in images where areas of uniform graylevel are common, the most probable quantization level will be QN=Q0 (where Q0=0) and the shortest codeword is assigned to that event.

One further aspect of predictive coding is reconstructing graylevel values for pixels after the original values therefor have been predictively coded. In generating a reconstructed value for a "current" pixel, the predicted value thereof P and the value designated for the quantization level (e.g., Q1=4) are summed. The reconstructed value X' should be close to the original input value X but may differ. Because D and its assigned QN VALUE may differ, the original value $X=(D+P)$ and the reconstructed value $X'=(P+QN\ VALUE)$ may differ. The largest difference depends on the range of D values being quantized to a given QN VALUE.

Significantly, different pixels having an original graylevel value of X may have differing respective reconstructed values X'. Moreover, in predictive coding, successive pixels in a row located in an area of uniform original graylevel will tend to have the same X' value; the reconstructed value X' propagating along the row. If a first row propagates a reconstructed value $X'_1$, a second row propagates another reconstructed value $X'_2$, and a third row propagates its own respective reconstructed value $X'_3$, the pixels in each row will display graylevels of slightly different magnitudes. If the magnitudes are sufficiently different to be perceptible, the variations will be seen as distortion, or streaking, in an image formed from reconstructed pixel values.

Viewed in another way, if the range of difference values corresponding to the Q0 level is wide, possible variation between respective reconstructed values X' of rows in an area of originally uniform graylevel is correspondingly great. In such event, streaking becomes a problem.

Reducing the range of difference values assigned to the Q0 level would appear, at first blush, to be a solution to the streaking problem. If the Q0 level range of difference values is sufficiently small, any variation in reconstructed pixel value from one line to another would not be perceived.

However, by shrinking the range of the Q0 level, there is a great loss in data compression.

This leads to a dilemma: to achieve more data compression, the range of difference values assigned to the Q0 level should be broad; however, a broad range of difference values for Q0 can result in streaking. In areas of low image activity (that is, areas where pixels have substantially uniform original graylevel values), achieving data compression without perceptible streaking has been a significant problem.

A further problem relating to distortion in the form of streaking involves a phenomenon referred to as "Machbanding". In particular, graylevel "step" transitions in an image are typically exaggerated when viewed by a human. The difference between two graylevels—at a step transition—thus appears greater than the actual difference therebetween and provides undesired distortion.

A three-pass postprocessor filter has been suggested by the prior technology to address the problem of the exaggerated perception of streaks. However, the three-pass technique requires lengthy execution time. The first pass is a nearest neighbor filter, the second pass is a two nearest neighbor filter, and the third pass is a four nearest neighbor filter. Even without employing the third pass, the second pass two nearest neighbor filter requires 17 seconds on an IBM PC-AT, using a highly optimized register intensive assembly language implementation. A full software implementation of the original post-processing filter is thus impractical.

SUMMARY OF THE INVENTION

In accordance with the present invention, apparatus and method are provided for reducing streaking step size in an image derived from reconstructed pixel values and also, preferably, reducing the effects of "Machbanding" without sacrificing coding compression.

In particular, the present invention involves two methodologies which preferably are combined. The first methodology which is applied to affect areas of low image activity, where the selected quantizer level is Q0=0, is referred to as "error carry". Assuming a symmetrical quantizer, it involves (a) remapping the quantizer error QERR=D to an MERR value wherein each QERR value such that $|QERR| \leq (+Q1\ VALUE)/2$ is remapped to MERR=0; (b) accumulating the MERR values for successive pixels wherein the Q0 level is again selected; and (c) adjusting the QN value of a pixel and resetting the sum when the magnitude of accumulated sum of MERR values exceeds a predefined threshold value THRERRA. For a symmetrical QN table, reaching the threshold THRERRA forces a positive or negative correction of the selected quantizer value by the value corresponding to the Q1 level, where Q1 is the smallest non-zero quantization level. This correction is, in effect, a form of "error carry" correction. Note that the sign of the correction will correspond to the sign of MERR.

The first methodology in effect tracks accumulated error introduced by the quantization process in a particularly efficient manner by remapping the QERR values into MERR values, subject to the limitation that QERR be remapped to MERR=0 when |QERR| has a prescribed relationship with Q1.

The threshold THR0 is defined as the decision level that determines the range of DPCM difference values that are to be mapped to a zero quantization value. When combined with entropy coding, a larger value of THR0 enables greater image data compression.

In accordance with the first methodology, THR0 is increased above the level suggested by J. Max in an article entitled "Quantizing for minimum distortion", IRE Transactions on Information Theory, IT-6, 7, 1960.

The remapping of the quantizer error prior to integration is of fundamental importance to the first methodology. The remapping, which can be implemented via a look-up table, assigns a value of zero to quantizer errors whose magnitude is less than or equal to $(+Q1\ VALUE)/2$. This requirement avoids limit cycle oscillations—introduced by the non-linear nature of the quantization process—that would reduce compression gains obtained by having a large THR0. In addition, whenever the threshold THRERRA is reached, the correction reduces the magnitude of the quantizer error to values less than or equal to $(+Q1\ VALUE)/2$. In this manner, attenuation of the largest streaks is achieved to a level similar to that achieved by the Max quantizer, but with greater compression.

Isolated quantizer errors that are relatively large will not automatically trigger the correction process. Only the integrated effect of these errors can trigger the correction. One can think of this scheme as a filter for spurious spots. Similarly, low-amplitude quantizer errors—those that are remapped to a zero value—are completely ignored, regardless of their spatial frequency.

The first methodology serves to affect the graylevel values to reduce horizontal streaking without compromising compression.

The second methodology addresses the Mach-banding problem. In particular, the second methodology involves a postprocessor filter which re-evaluates the reconstructed value of a pixel in a low activity (i.e., relatively uniform graylevel) area based on values for selected neighboring pixels. In particular, in an image in which a current pixel has an initial graylevel value $I_0$ and the pixel adjacently above has a graylevel value $I_1$ and the pixel adjacently below has a graylevel value $I_{-1}$, a filtered value $I'_0$ for the current pixel is determined to be equal to $$I_0 + W[(I_{-1} - I_0)_{C-} + (I_{+1} - I_0)_{C+}]$$

in which the two differences are each limited in magnitude by a respective predefined value C− or C+ and in which W is substantially equal to 1.

Moreover, where pixel $I_{-1}$ is previously interpolated according to the expression:

$$I_{-1} = \frac{(I_{-2} + I_0)}{2}$$

(the subscripts indicating distance from the current pixel) and where pixel $I_{+1}$ is previously interpolated according to the expression:

$$I_{+1} = \frac{(I_{+2} + I_0)}{2},$$

the filtered value becomes, subject to clamping limits:

$$I'_0 = W \frac{(I_{-2} + I_{+2})}{2}$$

where W is substantially equal to 1.

With regard to the postprocessor, it is significant that the weighting factor W is set preferably equal to 1. In the prior art (e.g., U.S. Pat. No. 4504864), multipass filtering which employs sum-of-difference expressions suggests a weighting factor of approximately $\frac{3}{4}$. That is, a first-order pass of the prior art includes computing a first-order value:

$$I^1{}_0 = I_0 + \tfrac{1}{4}[(I_{-1}-I_0)c + (I_{+1}-I_0)c].$$

A second-order filter based on the two nearest neighbors is based on a similar expression:

$$I^2{}_0 = I^1{}_0 + \tfrac{1}{8}[(I_{-2}-I_0)c_2 + 2(I_{-1}-I_0)c_2 + + 2(I_{+1}-I_0)c_2 + (I_{+2}-I_0)c_2].$$

Applying the interpolation expressions to the second pass equation, $I^2{}_0$ is approximated as:

$$I^2{}_0 = I^1{}_0 + \tfrac{1}{2}[(I_{-1}-I_0) + (I_{+1}-I_0)]$$

which is in the same form as the first pass except that the weighing factor is $\frac{1}{2}$ instead of $\frac{1}{4}$. (For small differences the clipping factor is ignored.) Together, the two passes provide a weighting factor of approximately $\frac{3}{4}$ for the sum of differences. Through experimentation with human observers, the weighting factor of W equal to (or substantially equally to) 1 has provided improved results, i.e., smooths the perceived transitions and reduces streaking.

The single pass with weight of one replaces thus the two passes in the multipass filtering. In comparison with the prior multipass method, the present postprocessor saves computation time by providing filtering in a simple single pass. Of particular significance, the present postprocessor is readily integrated into data compression methodology in which alternate lines forming a first field are compressed—with reconstructed pixel values being generated therefor—and in which values for pixels in the remaining lines (of a second field) are interpolated from the reconstructed values of first field pixels.

Because the present postprocessor uses only a simple nearest neighbor filter structure on alternate lines of the image and because the filter is integrated into, and takes advantage of, calculations required for the second field compression algorithm, only about 1.2 seconds of IBM PC-AT (6 MHz) processing time beyond that normally required when decompressing an image is required. Use of the second methodology of the invention result in a reduction in the required time for decompressing the data from approximately 30 seconds to less than 12 seconds.

DESCRIPTION OF THE INVENTION

In general, an image data compression/decompression system according to the present invention first applies predictive encoding to graylevel data for a "current" pixel to derive a QN value therefor, and thereafter subjects the derived QN value to entropy encoding to produce compressed image data. The compressed image data may be stored or transmitted as desired in compressed form. In decompression, the inverse operations to entropy and predictive encoding are applied to the compressed data in order to generate graylevel values which substantially correspond to the original graylevel input values.

Figure 1:
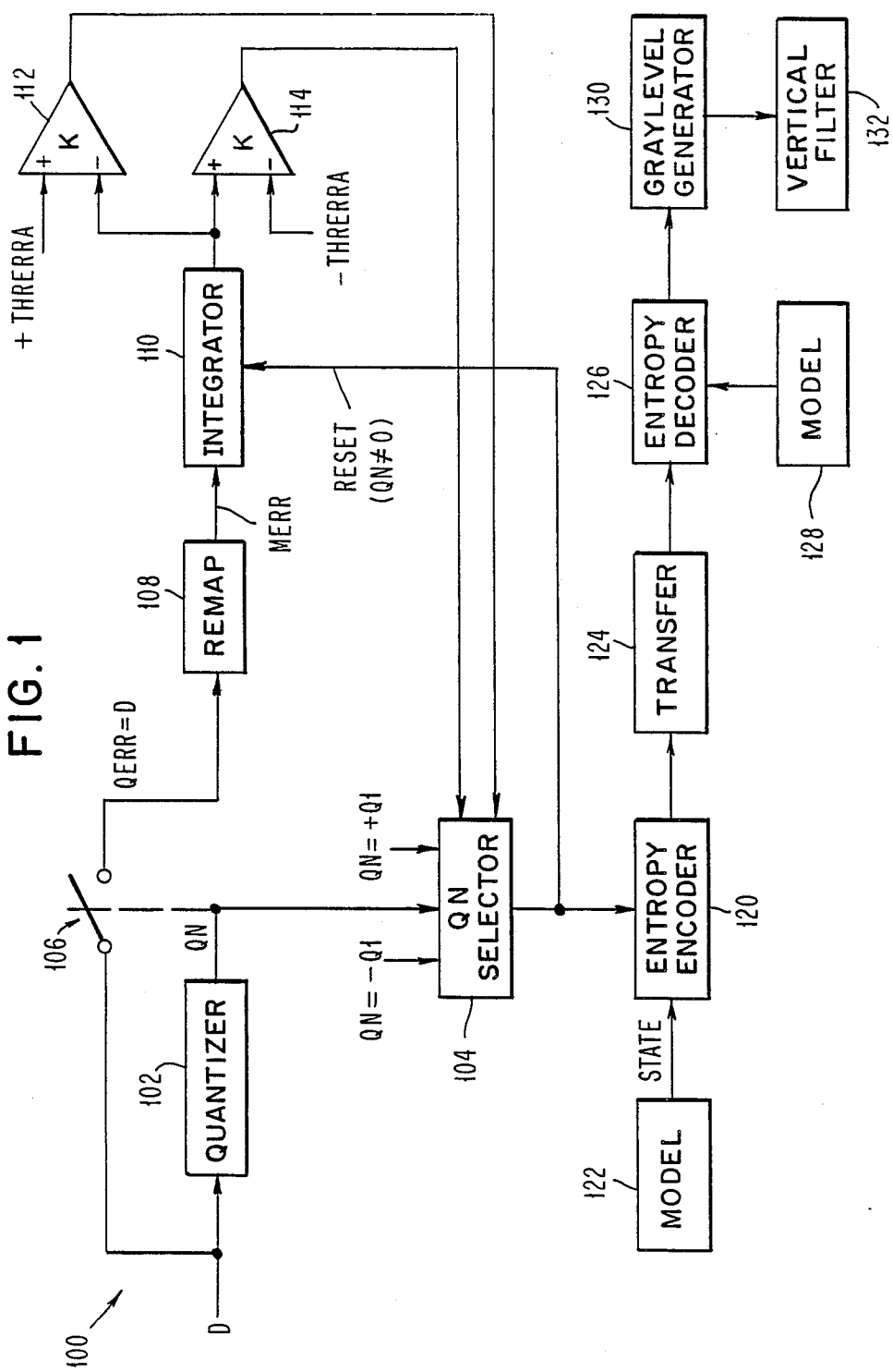
FIG. 1 is a block diagram showing an image data compression/decompression system including predictive coding error carry and a vertical filter postprocessor according to the invention.

Referring to FIG. 1, a preferred embodiment of an image compression/decompression system 100 according to the invention is shown. A previously generated value D is shown entering a quantizer 102 and the switch 106. The value D is preferably a difference value determined by first generating a predicted value P for the current pixel and subtracting P from the original graylevel value X of the current pixel. The predicted value P may be determined in any of various ways. For example, P may correspond to a graylevel value associated with the pixel left adjacent to the current pixel or may be otherwise computed from values associated with pixel which are neighbors of the current pixel. In any specific embodiment, P has a consistent definition. Regardless of how P is defined, it is preferred that $D = X - P$.

The quantizer 102 groups the D values according to magnitude and assigns a QN value to each group. Preferably the quantizer 102 is a ROM look-up table which matches each D value to a corresponding QN value.

At this point it is observed that the present system is "lossy". That is, in quantizing the difference values D during compression, some information is lost.

The QN value enters a QN selector 104. When the value of QN=0 the switch 106 is closed and the corresponding D value yields a QERR value. The QERR value enters a remap element 108. The remap element 108 groups the QERR values and assigns a corresponding MERR value to the values in a given group. That is, QERR values in a first range are assigned a first MERR value; QERR values in a second range (of larger values) are assigned to a (larger) MERR value; and so on.

Of major importance, the value MERR=0 is preferably assigned to all QERR values in which $|QERR| \leq (+Q1\ VALUE)/2$.

MERR values for pixels in a row of relatively uniform graylevel (QN=0) are accumulated (e.g., summed) in an integrator 110. It is noted that for those $|QERR|$ values which are less than or equal to $(+Q1\ VALUE)/2$, the sum generated by the integrator 110 does not increase. For other values of QERR, corresponding MERR values are added to the sum. The integrator 110 is reset at appropriate times as described hereinbelow.

The sum produced by the integrator 110 is compared to a positive threshold +THRERRA and a negative threshold −THRERRA in respective comparators 112 and 114. The output lines of comparators 112 and 114 are connected to the QN selector 104.

The QN selector 104 receives as input the QN values generated by the quantizer 102. Hence the input to the QN selector 104 may correspond to the value for Q0 (which, in the preferred mode, is valued at 0) or may correspond to the value for Q1, Q2, or so on.

If the comparator 112 indicates that +THRERRA has been reached, a signal to the QN selector 104 indicates that the QN selector 104 is to output +Q1 VALUE. Similarly, if −THRERRA is reached, a signal from comparator 114 triggers the QN selector 104 to produce the −Q1 VALUE as output. If none of the thresholds is exceeded the QN output from the quantizer 102 is selected. In any of the above three cases, a signal indicating that a QN value not equal to zero is output from the QN selector 104 and provides a reset input to the integrator 110. The reset input initializes the sum stored by the integrator 110 to zero.

It is thus observed that the integrator 110 adds MERR values only so long as the QN selector 104 outputs the Q0 value (i.e., zero) and resets each time either THRERRA is reached or QN≠Q0 is outputted from the quantizer 102. The summing of MERR values and adjusting the quantizer selector output represents an "error carry" correction in accordance with the invention.

A specific embodiment of the "error carry" aspect of the invention is now described.

Table 1 includes values for a sample specific quantizer (see quantizer 102 of FIG. 1). Disregarding the sign of the DPCM difference D (which can be dealt with separately), the quantizer (102) identifies a DPCM difference in the range (0,2) with the quantization level Q0=0; a difference in the range (3,8) with the level Q1=4; a difference in range (9,16) with the level Q2=12. Other differences are similarly identified using higher ranges in Table 1. (The notation used here is conventional, i.e. (3,8) means that the range spans the values between 3 and 8 including those two values.

TABLE 1

| level | decision | QN |
|---|---|---|
| 2 | | 0 |
| 8 | | 4 |
| 16 | | 12 |
| 27 | | 22 |
| 40 | | 34 |
| 55 | | 48 |
| 72 | | 64 |
| 91 | | 82 |
| 112 | | 102 |
| 135 | | 124 |
| 160 | | 148 |
| 187 | | 174 |
| 216 | | 202 |
| 247 | | 232 |
| infinity | | 255 |

Table 2 shows a similar quantizer for which the first decision level has been increased. Using previously introduced notation, THR0=2 in Table 1 and THR0=4 in Table 2.

TABLE 2

| level | decision | QN |
|---|---|---|
| 4 | | 0 |
| 8 | | 4 |
| 16 | | 12 |
| 27 | | 22 |
| 40 | | 34 |
| 55 | | 48 |
| 72 | | 64 |
| 91 | | 82 |
| 112 | | 102 |
| 135 | | 124 |
| 160 | | 148 |
| 187 | | 174 |
| 216 | | 202 |
| 247 | | 232 |
| infinity | | 255 |

Table 3 shows the results of compressing a set of test images with the two quantizers. Also shown is distortion as measured by the root mean square (RMS) criterion. As expected, setting THR0=4 (column b) substantially improves compression performance over setting THR0=2 (column a). However, distortion is lower in the latter case.

Column (c) of Table 3 shows the results of setting THR0=4 and applying the method described herein. Compression compares well with that in column (b); also, at the same time, although the degree of RMS distortion appears comparable to that in (b), human observers preceive a more pleasing image than in (b). Using Table 1 results in best image quality, but the quality is achieved at the cost of compression. The results in column (c) represent a reasonable compromise in terms of quality and compression.

TABLE 3

COMPRESSED BYTES AND RMS DISTORTION OF FIVE 256 × 240 TEST IMAGES

| | a | | b | | c | |
|---|---|---|---|---|---|---|
| | BYTES | RMS | BYTES | RMS | BYTES | RMS |
| marcos | 12302 | 3.35 | 9306 | 3.84 | 9657 | 3.79 |
| t2 | 13210 | 3.54 | 10274 | 3.89 | 10772 | 3.84 |
| fruit | 14992 | 4.40 | 11689 | 4.74 | 12178 | 4.72 |
| ieee | 15840 | 5.02 | 12850 | 5.24 | 13373 | 5.18 |
| denset | 18179 | 5.97 | 16296 | 6.14 | 16537 | 6.10 |
| average | 14905 | | 12083 | | 12503 | | a . . . Using quantizer of Table 1
b . . . Using quantizer of Table 2
c . . . Using quantizer of Table 2 and the present invention The methodology of "error carry" starts with defining QN as the quantization level selected during predictive coding. The results in column (c) were obtained by applying the following steps to every consecutive subject pixel. (The methodology set forth in the flowchart of FIG. 2.)

Figure 2:
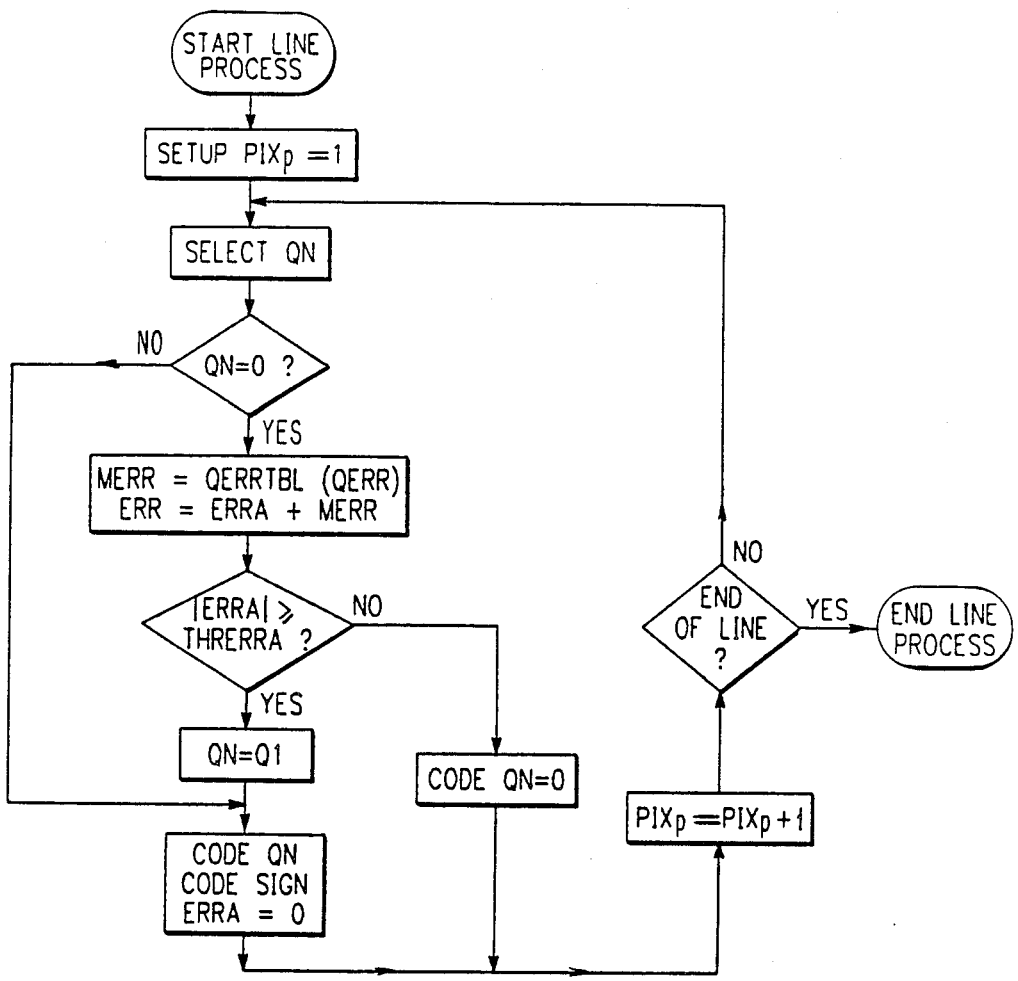
FIG. 2 is a flow chart showing the methodology of the invention, illustrating the processing of one line of a raster scanned image.

(a) For QN=Q0=0:
  (i) Remap the quantizer error, QERR, using Table 4.
  (ii) Accumulate the remapped error, MERR, in an integrator register ERRA.
  (iii) Check whether the magnitude of ERRA has reached a threshold THRERRA.
  (iv) If THRERRA has been reached, force QN=Q1 and go to step (b)
  (v) If THRERRA has not been reached, code QN=Q0, and process next pixel.
(b) For QN≠Q0
  (i) Code QN and its associated sign.
  (ii) Set ERRA=0 and process next pixel As shown by FIG. 2 and the previous description, the sign of the DPCM difference also needs coding whenever QN≠0. The actual coding of QN and its sign can be accomplished by suitable models for entropy coding, such as those described in the aforementioned co-pending patent application.

TABLE 4
(QERRTBL)

| QERR | MERR |
|------|------|
| −4 | −1 |
| −3 | −1 |
| −2 | 0 |
| −1 | 0 |
| 0 | 0 |
| 1 | 0 |
| 2 | 0 |
| 3 | 1 |
| 4 | 1 |

Figure 3:
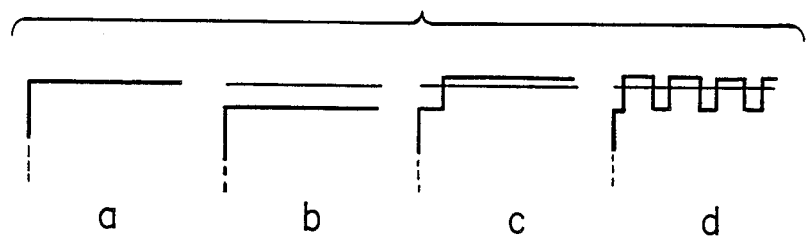
FIG. 3 is a diagram that illustrates a hypothetical line of image data under four different sets of conditions: (a) original data; (b) reconstructed data without error carry correction; (c) reconstructed data with error carry correction and remapping of quantizer errors; and (d) reconstructed data with error carry correction and one-to-one remapping of quantizer errors.

To demonstrate the problems which occur when QERR is not mapped based on the preferred relationship with Q1 VALUE, reference is made to FIG. 3. FIG. 3 graphically shows the events described above, applied to a sequence of pixels. In part (a), the original values of the pixels are illustrated. Part (b) of FIG. 3 shows the reconstructed values using the quantizer in Table 2 without any corrections. Part (c) shows the same results after adding error carry correction with remapping of quantizer errors via Table 4. Part (d) is similar to (c) except that the remapping step is the identity operator, i.e., MERR=QERR.

For FIG. 3, it is assumed that (i) The quantizer of Table 2 is used;
(ii) A DPCM previous pixel predictor is used.

The quantizer error in (b) is QERR = −3. One important feature of part (d) of this diagram is that—because of the granularity of the quantizer (as defined by Q1)— QERR is continuously cycling between the values of −3 and +1. This effect, in turn, is accompanied by cyclic quantizer corrections where the QN value is +Q1 VALUE or −Q1 VALUE. The end result is limit cycle oscillations, typical of nonlinear feedback systems, that produce poor compression. This effect is the same regardless of the initial QERR (except for QERR=4 and QERR=−4 in the example).

Part (c) of FIG. 3 illustrates the sequence of events when QERR is remapped using Table 4. After an initial delay, the correction is such that—if generated—it results in QERR locking into the smaller magnitude value (in the example, this value is +1). This behavior is not only desirable from the point of view of compression performance, but also from the point of view of distortion. Note that similar results are obtained for other DPCM predictors.

The following requirement implemented in Table 4

$$MERR = 0 \text{ for } |QERR| \leq \frac{Q1}{2}$$

is now discussed. Other aspects of Table 4 can be varied, but the above formula should be used if limit cycles are to be avoided. Further, this formula also ensures that streaking is limited, so that graylevel disparity is limited by the amplitude (+Q1 VALUE)/2. This amplitude is far superior to that of a coder without error carry correction, where the maximum amplitude of the streaks is THR0.

In FIG. 1, the QN value output from the QN selector 104 enters an entropy encoder 120. The entropy encoder 120 is preferably an arithmetic coding encoder. In accordance with entropy coding, a model 122 provides a state input to the entropy encoder 120. The state provides a context—normally based on history—for the QN value which enters the entropy encoder 120. The entropy encoder 120 encodes the QN value input thereto so that more probable QN value inputs are represented by codes of shorter lengths and less probable QN value inputs are represented by codes of longer lengths. The state input helps identify the conditional probabilities of the QN values.

The output of the entropy encoder 120 is image data in compressed form. As one pixel after another is processed as the "current" pixel, successive QN values are output from the QN selector 104 and enter the entropy encoder 120. The entropy encoder 120 outputs a stream of compressed data for the successively processed pixels. The stream of compressed data is directed to a transfer medium 124 for either storage or for transmission. The stream of compressed data is provided as one input to an entropy decoder 126. The other input to the entropy decoder is a state input from a model 128 which corresponds to the model 122. The entropy decoder 126 provides the QN value as output. A graylevel generator 130 determines a graylevel value for each QN value produced by the entropy decoder 126.

The graylevel generator 130 typically includes an inverse quantizer (not shown) which provides a difference value D' for a given entropy decoded QN value and a predictor element (not shown) which computes a predicted value P' computed in the same manner that P is computed. For example, if the value for the left adjacent pixel is the predicted value P (used in computing the input value D for quantizer 102), the decompressed value computed for the left adjacent pixel serves as the predicted value P' for the current pixel. By adding D' and P', a decompressed graylevel value $I_0$ for a current pixel is determined.

Pixels are compressed and decompressed in the same order—normally left to right along one row after another. In this regard, successive adjacent rows may be processed in order downward through the image if desired. Alternatively, however, the rows may be processed by fields (e.g., odd rows being processed first and then even rows being processed thereafter).

In either event, the graylevel generator 130 computes decompressed graylevel values for each pixel in the image. It is noted that, in areas which are originally uniform in graylevel, the decompressed value may differ from one row to the next. That is, vertically there are step-like transitions in decompressed graylevel value.

Figure 4:
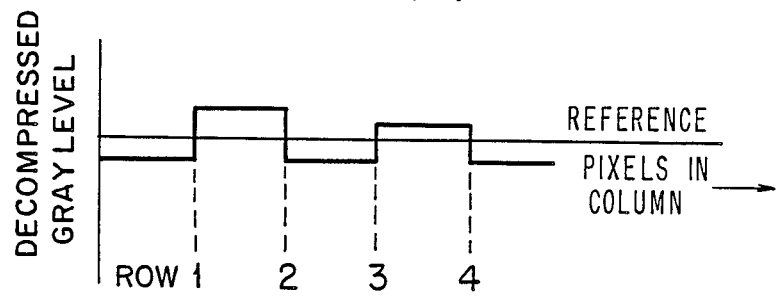
FIG. 4 is a graph showing the graylevel values of pixels aligned in a column of pixels.
Figure 5:
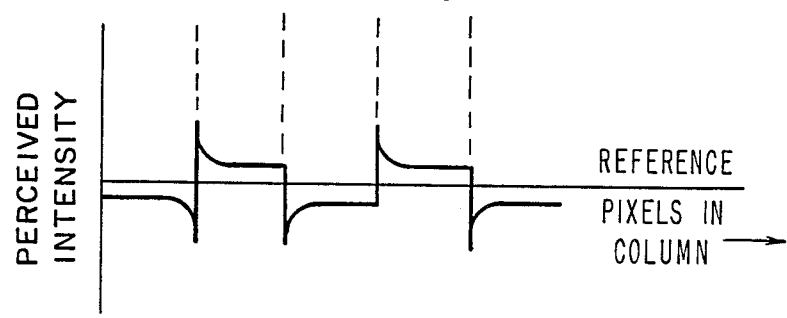
FIG. 5 is a graph showing how the human visual system emphasizes the step transitions illustrated in FIG. 4.

In FIG. 4, the decompressed graylevel of pixels in successive rows and aligned in a single column are shown. The pixels are in an area in which the QN value is zero—which suggests a relatively uniform graylevel region. FIG. 5 is a graph depicting how human vision perceives the graylevels shown in FIG. 4. In FIG. 5, step transitions are perceived as enhanced contrasts (depicted as intensity spikes in the graph) in accordance with the well-known phenomenon of Mach-banding.

In order to attenuate the perceived contrasts, a vertical filter 132 is included in FIG. 1 following the graylevel generator 130. The vertical filter 132 in effect smooths the steps of FIG. 4 to soften the perceived transitions.

The vertical filter 132 serves to aid in reducing horizontal streaking and transition distortion. In particular, the vertical filter 132 includes a non-linear, simple nearest neighbor filter structure which postprocesses pixels in preferably alternate lines. The vertical filter 132 and the context in which it is used is now described.

The vertical filter 132 simply adjusts the value $I_0$ of a current pixel based on the values of pixels vertically above and below the current pixel.

In particular, in an image in which the current pixel has an initial (reconstructed) graylevel value $I_0$ and the pixel adjacently above has a graylevel value $I_{+1}$ and the pixel adjacently below has a graylevel value $I_{-1}$, a filtered value $I'_0$ for the current pixel is determined to be equal to $I_0 + W[(I_{-1} - I_0)_{C-} + (I_{+1} - I_0)_{C+}]$ in which the two differences are each limited by a respective predefined value $C-$ or $C+$ and in which W is substantially equal to 1.

In one embodiment, the vertical filter 132 is applied to pixel data generated for an entire image (i.e., without dividing the image into separate interlaced fields). In such an embodiment, a reconstructed value is generated for each pixel independently.

Alternatively, the vertical filter 132 is advantageously employed where the image is divided into two interlaced fields—one including pixels in odd rows and the other including pixels in even rows.

Details on image compression employing two interlaced fields is set forth in a co-pending patent application assigned to the IBM Corporation (the assignee of the present application) and entitled: "Compression and Decompression of Column-Interlaced, Row-Interlaced Graylevel Digital Images" invented by C. Gonzales, W. Pennebaker, and J. Mitchell and filed on Mar. 20, 1987, which application is incorporated herein by reference to the extent necessary to disclose two-field image data compression.

Figure 6:
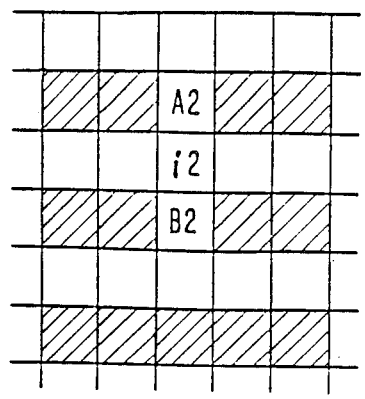
FIG. 6 is an illustration showing pixels in an image, pixel i2 being a pixel processed based on previously determined values A2, B2, and L2 of neighboring pixels.

Reference is made to FIG. 6 for purposes of summarizing relevant aspects disclosed in the aforementioned patent application. It is assumed that the pixels in the row above and in the row below the row containing pixel i2 have been processed already and have respective values assigned thereto. The row above and the row below pixel i2 and similarly alternating rows are considered—in this description—as being in the first field of the image; the remaining rows which include pixels yet to be processed are in the second field of the image. In the processing of pixel i2 for subsequent entropy coding, a predicted value thereof is determined as:

$$I2' = \frac{(A2 + B2)}{2}.$$

(The predicted value is used in determining the value D as discussed hereinabove). In determining the state input which is provided to the entropy encoder for pixel i2, a gradient value is computed as $I2' - A2$. The state input has (i) a gradient portion which is derived from the gradient value and (ii) a sign portion which is derived from the sign of the quantized output for the pixel to the left of pixel i2.

Noting that in the present invention $I2'$ corresponds to $I_{+1}$, A2 corresponds to $I_{+2}$, and B2 corresponds to $I_{-0}$, it is observed that the computations employed in the compression process correlate to the computations employed in the postprocessor. That is, $$I2' = \frac{(A2 + B2)}{2} \text{ is } I_{+1} = \frac{(I_{+2} + I_0)}{2}.$$

Similarly, the computation for the gradient, namely $(I2' - A2)$ is—except for sign—$(I_{+1} - I_0)$. For purposes of the postprocessor, these values are precomputed (i.e., computed during compression) and need not be computed again.

By way of further note, the interpolation performed on a second field pixel exactly splits the difference between the two first field pixels. In regions where activity of the image is high, the interpolation may be altered; and in such regions streaking is masked by the activity. Hence, the vertical filter 132 is to be applied to only pixels in regions of low activity. In regions of low activity, a nearest neighbor filter does not change the interpolated pixels. Moreover, a second-pass two-nearest neighbor filter introduces only second order changes in these second field lines, as the two closest neighbor differences cancel. Therefore, first-pass filtering of second field rows has no effect, and second-pass filtering can at most introduced very small changes. Consequently, post-processing second field rows provides no appreciable benefit and hence is not performed. This results in computational efficiency.

A technique for segmenting an image based on low and high image activity is described in a co-pending patent application filed by the present inventors and assigned to the IBM Corporation (assignee in the present application), U.S. Ser. No. 946542, filed on Dec. 22, 1986 and entitled "Adaptive Graylevel Image Compression System", which is incorporated herein by reference as necessary for adequate disclosure.

It is observed that the same computation used in the data compression process are used in the vertical filter 132. This results in a reduction in overall computation requirements. In addition, the vertical filter 132 can be integrated with software code used in the interpolation of second field values.

Also with regard to the two-field embodiment, it is observed that the vertical filter 132 is run on only first field rows, the second field rows being determined therefrom.

In the equation $$I'_0 = W \frac{(I_{-2} + I_{+2})}{2},$$

setting W=1 is equivalent to interpolation of the first field rows when the differences are small. Because the above equation is derived from the sum-of-difference equation $I_0 + W[(I_{-1} - I_0)_{C-} + (I_{+1} - I_0)_{C+}]$, there is implicit therein a clamping limit. Satisfactory results are achieved when the clamping limits (i.e., C+ and C−) for $(I_{+2} - I_0)_{C+}$ and $(I_{-2} - I_0)_{C-}$ is 4. This is equivalent to clamping limits of eight for the differences $(I_{+1} - I_0)_{C+}$ and $(I_{-1} - I_0)_{C-}$.

Figure 7:
FIG. 7 through FIG. 10 show the data for a column of reconstructed image data processed under four different conditions, where the original source data corresponds to a region with a constant graylevel value.
Figure 8:
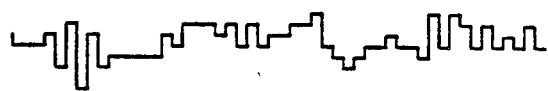
Figure 9:
Figure 10:

FIG. 7 through FIG. 10 show plots for a column of reconstructed image data processed under four different conditions. In each plot, proceeding from left to right corresponds to traversing from one row to another along a column of pixels in an image. FIG. 7 represents reconstructed data—in a region with a uniform graylevel—where the data was not processed by the present invention. In FIG. 8, only the vertical filter aspect of the invention is employed. In FIG. 9, only the "error carry" aspect is employed. FIG. 10 represents data subjected to "error carry" and vertical filtering according to the invention. In examining the plot in FIG. 10, it is observed that there is greater conformance in value from row to row in the column. That is, there is significantly less variation in amplitudes, especially compared to the plots of FIGS. 7 and 8. Compared with FIG. 9, the plot of FIG. 10 shows a reduction in step transitions along the column; large steps, for example, are shown reduced in size and/or split into several smaller steps in FIG. 10. Also, by providing enhanced weighting of the difference between adjacent first field rows, a dithering of values for the rows results which serves to mask streaks.

The plots demonstrate the effectiveness of combining "error carry" and post-filtering as set forth hereinabove in attenuating streaking and other perceived distortion.

In accordance with the invention, the quantizer 102—as noted hereinabove—is implementable as a ROM table. Similarly, the REMAP 108 is implementable by a ROM table. The switch 106, the integrator 110, and the threshold comparators 112 and 114 are conventional elements. The entropy coding elements are implementable by conventional entropy coding elements. Preferably, the entropy coding is performed as set forth in a co-pending patent application assigned to the IBM Corporation (the assignee hereof) and entitled "Arithmetic Coding Encoder and Decoder System," U.S. Ser. No. 06/907714, filed on Sept. 15, 1986 which is incorporated by reference to the extent required for describing entropy encoding. The graylevel generator 130 is generally described in the aforementioned patent application "Adaptive Graylevel Image Compression System", which is incorporated herein by reference to furnish disclosure pertaining to deriving graylevel output from entropy decoded data.

While the invention has been described with reference to preferred embodiments thereof, it will be understood by those skilled in the art that various changes in form and details may be made without departing from the scope of the invention.

For example, remapping QERR to MERR values preferably involves remapping to a smaller set of values; however, remapping also relates to one-to-one remapping in which QERR values are remapped to themselves or some other respective value.

Also, the above described embodiment discloses a QN table which is symmetrical about Q0. However, as an alternative, the quantizer levels may be nonsymmetrical. For example, the QN levels may be defined as $Q(-3)$, $Q(-2)$, $Q(-1)$, Q0, Q1, and so on with each level having a respective negative, zero, or positive value. In such event, the preferred remapping would also be non-symmetrical. That is, a remapping to zero occurs when $$\frac{Q(-1)\text{VALUE}}{2} \leq 0 \leq \frac{Q1\text{VALUE}}{2}.$$

It is further preferred that clamping limits C+ and C− are the same although the two limits may differ. Similarly, the thresholds −THRERRA and +THRERRA may be the same or may differ as desired.

The invention has been implemented on an IBM 370 computer with a PDS (Programming Development System) language which uses a forward Polish notation. However, the present methodologies are also implementable in software in any of various programming languages (such as PASCAL or an assembler language) on any of various computing systems.

We claim:

1. In a gray level image data processor which includes (A) a predictive coder which (i) computes a predictive difference value D for the current pixel and (ii) quantizes the difference D to a QN value wherein the number of QN values is less than the number of permitted D values, and wherein ranges of larger D values correspond to QN values of relatively larger magnitudes wherein QN=Q0 corresponds to a region of substantially uniform gay level and (B) an entropy encoder which receives as input and compresses QN value data from the predictive coder, a machine-implemented method for reducing distortion in an image reconstructed from data subjected to compression by predicting coding, the method comprising the steps of:
    (a) for each pixel at which QN=Q0, setting a value QERR equal to D;
    (b) remapping the set QERR value to a value MERR;
    (c) summing the MERR values for successive pixels in a QN=Q0 region; and
    (d) for a pixel at which the sum of MERR values reaches a predefined threshold, adjusting the QN value thereof.

2. The method of claim 1 wherein step (b) includes:
    (e) re-mapping QERR values to MERR values; and
    (f) assigning to the values MERR=0 those QERR value in which $$|\text{QERR}| \leq (+Q1 \text{ VALUE})/2$$

where Q1 is the closest in value quantization level to Q0.

3. The method of claim 2 wherein step (e) includes the steps of:
    (g) re-mapping QERR=−4 and QERR=−3 to an MERR value of −1;
    (h) re-mapping QERR=−2, QERR=−1, QERR=0, QERR=1, and QERR=2 to an MERR value of 0; and
    (j) re-mapping QERR=3 and QERR=4 to an MERR value of 1.

4. The method of claim 2 wherein step (d) includes the steps of:
    (k) adjusting the QN value by the Q1 value when the sum reaches a predefined threshold; and
    (l) resetting the sum of MERR values.

5. The method of claim 4 comprising the further steps of:
    (m) reconstructing graylevel values for pixels in the image; and
    (n) filtering the reconstructed value $I_0$ for a current pixel to provide a filtered value of $I'_0$ which is equal to $$I_0 + [(I_{-1} - I_0)c_- + (I_{+1} - I_0)c_+]$$

wherein C+ and C− are respective predefined clamping values, and
    wherein $I_{-1}$ and $I_{+1}$ are the respective reconstructed values of pixels adjacently below and adjacently above the current pixel.

6. The method of claim 5 comprising the further step of:
    (p) repeating step (n) with one pixel after another in one alternating row after another being the current pixel.

7. A predictive coding encoder which supplies the output thereof to an entropy encoder, the predictive coding encoder comprising:

means for computing a value D representing the difference between an original graylevel value for a current pixel and a predicted value for the current pixel;

quantizer means for electronically associating each successive range of possible D values to a respective quantization level, each quantization level QN having a respective QN value representing the range corresponding thereto;

switching means for setting a value QERR to D when QN=Q0 wherein Q0 represents the lowest quantization level;

means for receiving QERR output from the switching means and re-mapping QERR values to MERR values so that the value MERR=0 assigned to those QERR values in which $|QERR| \leq (+Q1\ VALUE)/2$ wherein Q1 value is the value corresponding to the quantization level QN=Q1;

means for summing the MERR values for successive pixels in a QN=Q0 region; and means for receiving as input the MERR value sum and adjusting the QN value from the value of Q0 by the magnitude of Q1 for a pixel at which the summed value reaches a predefined threshold.

8. A vertical filter for adjusting the reconstructed value $I_0$ for a current pixel in an image where the pixel adjacently above the current pixel has a value $I_{+1}$ and the pixel adjacently below has a value $I_{-1}$, the filter comprising:

means for computing a first difference $(I_{-1}-I_0)$;

means for computing a second difference $(I_{+1}-I_0)$;

means for clamping the first difference and second difference to prescribed limits; and means for computing a filtered value $I'_0$ for the current pixel to be equal to $I_0+[(I_{-1}-I_0)c_- +(I_{+1}-I_0)c_+]$.

9. The vertical filter as in claim 8 wherein said $I'_0$ computing means includes:

means for interpolating the value of $I_{-1}$ as $$I_{-1} = \frac{(I_0 + I_{-2})}{2}$$

where $I_{-2}$ is the value of a pixel two pixels down from the current pixel;

means for interpolating the value of $I_{+1}$ as $$I_{+1} = \frac{(I_0 + I_{+2})}{2}$$

where $I_{+2}$ is the value of a pixel two pixels up from the current pixel; and means for computing $I'_0$ based on the interpolated values of $I_{-1}$ and $I_{+1}$.

* * * * *